T. YANO
AND
S. OKA
INVENTORS

BY Stevens, Davis, Miller & Mosher
ATTORNEYS

United States Patent Office

Re. 27,863
Reissued Jan. 1, 1974

27,863

VARIABLE RESISTOR OF SLIDING TYPE WITH SWITCH ACTIVATED BY SLIDER

Tadashi Yano, Osaka, and Shunzo Oka, Hirakata, Japan, assignors to Matsushita Electric Industrial Co., Ltd., Osaka, Japan Original No. 3,622,934, dated Nov. 23, 1971, Ser. No. 39,738, May 22, 1970. Application for reissue Oct. 3, 1972, Ser. No. 294,505

Claims priority, application Japan, Aug. 8, 1968, 43/68,917; May 30, 1969, 44/52,233; July 22, 1969, 44/71,631

Int. Cl. H01c *9/08*

U.S. Cl. 338—198 12 Claims

Matter enclosed in heavy brackets [ ] appears in the original patent but forms no part of this reissue specification; matter printed in italics indicates the additions made by reissue.

ABSTRACT OF THE DISCLOSURE

A variable resistor of sliding type with switch including a dielectric base having a resistance element and a conductive element, a slider being movable along a predetermined line on the dielectric base, a variable resistor of sliding-type means including the resistance element, the conductive element and a plurality of contactors being provided on the underside of the slider, a switching means including movable and stationary contacts and being provided on at least one of the both end portions of the dielectric base in the predetermined line, and a switch-working means being provided at the slider and being engaged with the movable contacts to actuate the switching means in connection with movement of the slider.

This invention relates to a variable resistor of the sliding type having a switch and more particularly, comprising in combination, a dielectric base; a slider movable on said dielectric base; a variable resistor means consisting of a resistance element and a conductive element which are arranged on the upper side of said dielectric base and a contactor provided on the underside of said slider; a switching means consisting of stationary and movable contacts which are arranged on at least one of the end portions of said dielectric base in the moving direction of said slider and a switch-working means that is arranged on the end of said slider opposite to said switching means.

When a conventional variable resistor of the sliding type is used in connection with other circuits, it is often necessary to be used together with a switch. However, we have never seen a variable resistor of the sliding type that is integrated with a suitable switch and has a simple construction and sure switching action.

An object of this invention is to provide a variable resistor of the sliding type which is integrated with a switch thereon, the switch being actuated in cooperation with the movement of the slider of the variable resistor.

Another object of this invention is to provide a variable resistor of the sliding type with a switch having a simple construction and sure switching action and being capable of being constructed in a rather small size.

The invention will be better understood from the following description taken in connection with the accompanying drawings in which.

Figure 1:
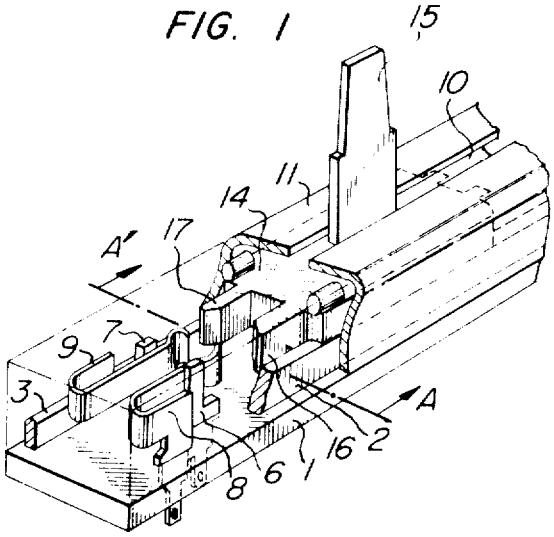
FIG. 1 is a partially broken perspective view of an embodiment according to the invention.
Figure 2:
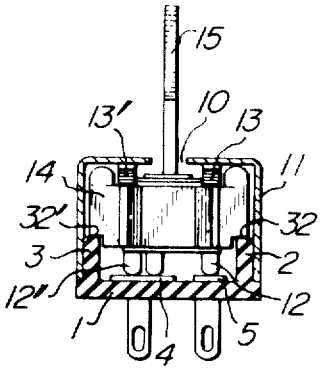
FIG. 2 is a sectional view along A—A of FIG. 1.

In FIG. 1, a dielectric base 1 is made of a dielectric material and provided with projecting guides 2 and 3 thereon substantially parallel to the imaginary longitudinal centerline 40 of the base 1. The base 1 is also provided with a resistance element 4 and a conductive element 5 being substantially parallel to the centerline 40. On the end portion of the base 1, each one of the stationary contacts 6 and 7 are mounted respectively at the both sides of the centerline 40. Each of the movable contacts 8 and 9 is formed into a U-shaped metallic spring element having one arm which is elongated beyond the center side of one of the stationary contacts and is provided with an angular portion at the end thereof. Each elongated arm of both movable contacts is urged to be moved away from the centerline 40 by its own spring force and hence, each of the movable contacts 8 and 9 is normally kept in contact respectively with the stationary contacts 6 and 7. The movable contacts 8 and 9, and the stationary contacts 6 and 7 compose the switching means of this embodiment.

The dielectric base 1 is covered with a box-type housing 11 having an elongated slot at the upper side thereof substantially parallel to the centerline 40. A slider 14 is arranged at the space between the dielectric base 1 and the housing 11. The slider 14 is provided with contactors 12 and 12' of metallic spring elements on the underside thereof and is held down by spring plates 13 and 13'. The slider 14 is provided with step portions 32 and 32' at both edges of the underside thereof parallel to the centerline and each of the step portions 32 and 32' engages with the guides 2 and 3 respectively. An operating means 15 is fixed to the upper side of the slider 14 and extends upward through the elongated slot 10 of the housing 11. Using operating means 15, the slider can be moved in such a manner that the steps 32 and 32' respectively slide on the guides 2 and 3, the movement of the slider 14 toward the switching means being restricted by stoppers 41 and 42 provided at the respective ends of the guides 2 and 3. The contactor 12 slides on the conductive elements 5 and the contactor 12' on the resistance element 4. The resistance element 4, the conductive element 5 and the two contactors 12 and 12' comprise a variable resistance of the sliding-type means identical to conventional sliding variable resistors.

At the end of the slider 14 opposing to the switching means, two working members 16 and 17 are arranged and comprise a switch-working means. When the slider 14 is moved up to the position closest to the switching means, both of the movable contacts 8 and 9 are inserted into the gap between the two working members 16 and 17, and the connections between the movable contacts and the stationary contacts are cut off. These switching actions are shown in FIGS. 3 and 4.

Figure 3:
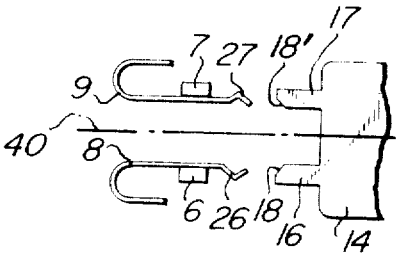
FIGS. 3 and 4 are explanatory drawings showing the action of the switching means in relation to the switch-working means of the embodiment shown in FIG. 1.
Figure 4:
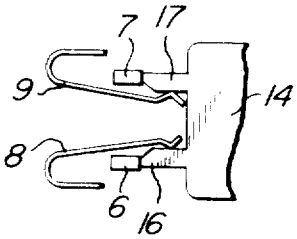

The working members 16 and 17 may be respectively provided with tapered portions 18 and 18' at each end thereof to make smoother the insertion of the movable contacts 8 and 9 into the gap between the two working members as shown in FIGS. 3 and 4.

Figure 5:
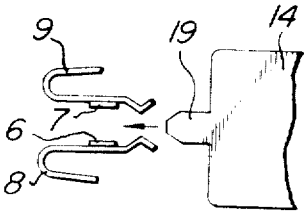
FIGS. 5 and 6 are explanatory drawings showing an embodiment with a modified switch-working means.
Figure 6:
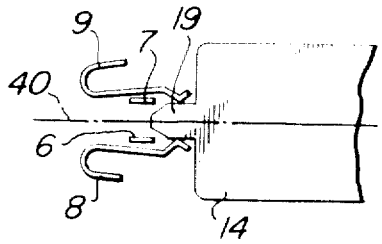

The switching means and the working members may be arranged as shown in FIGS. 5 and 6. In this case, each of the movable contacts 8 and 9 is urged to be moved towards the centerline 40 by its own spring force, and each of the stationary contacts 6 and 7 is disposed at the centerward of the respective movable contacts 8 and 9. Furthermore, the slider 14 is provided with a wedge-shaped operating member opposite to the switching means at the end wall of the slider 14. The wedge-shaped operating member is inserted into the gap between the movable contacts 8 and 9, and then each of the movable contacts 8 and 9 is moved away from the centerline 40. As a result, the connections of the movable contacts and the stationary contacts are cut off. Thus the switch means can be operated smoothly by the movement of the switch-working means that is moved together with the slider 14.

Figure 7:
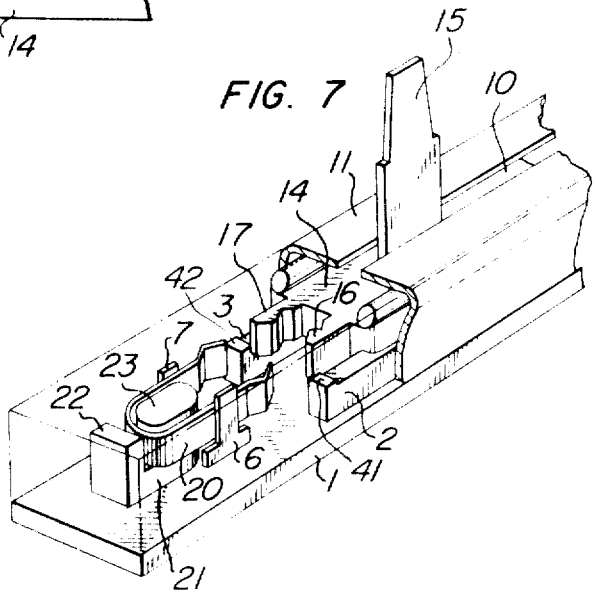
FIG. 7 is a partially broken perspective view of another embodiment according to the invention.

FIG. 7 shows another embodiment of the invention, in which the switching means and the switch-working means are modified from the embodiment shown in FIG. 1. In FIG. 7, at an end portion of the dielectric base 1, each of the stationary contacts 6 and 7 is arranged respectively at the both sides of the centerline 40 and substantially symmetrically with regard to the centerline. Two engaging stoppers 22 and 23 are mounted on the base 1 at the portion nearer to the end thereof than the stationary contacts 6 and 7, and are aligned in the centerline 40 with a gap between them. The two engaging stoppers may be formed to have a common base 21.

The stationary contacts 6 and 7 may be elongated beyond the underside of the dielectric base 1 to be used as output terminals (not shown). Reference numeral 20 designates a movable contact that is composed of a U-shaped metallic spring plate having a connection portion and two elongated portions. The connection portion is loosely fitted into the gap between the two engaging stoppers 22 and 23. Each of the elongated portions of the movable contact 20 is provided respectively with angular portions 26 and 27, and is urged to be moved away from the center by its own spring force and to abut against the respective stationary contacts 6 and 7. Thereby, each of the elongated portions of the movable contact 20 is normally held to contact respectively with the stationary contacts 6 and 7. The stationary contacts 6 and 7, the movable contact 20 and the engaging stoppers 22 and 23 compose in combination a switching means.

The slider 14 is provided with two working members 16 and 17 at the end of the slider 14 opposite to the switching means. Each of the working members 16 and 17 has respectively tapered portions 18 and 18', and also respectively pointed projections 24 and 25 at the end thereof. When the slider 14 is moved to the utmost end of its movement, both elongated portions of the movable contact are inserted into the gap between the two working members 16 and 17. And then, the connections of the movable contacts and the stationary contacts are cut off.

Figure 8:
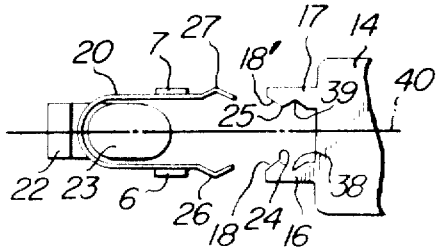
FIGS. 8 and 9 are explanatory drawings showing the action of the switching means in connection with switch-working means in the above embodiment.
Figure 9:
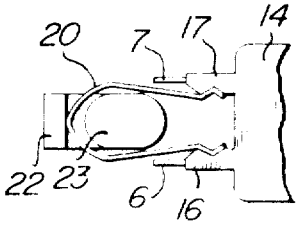

FIGS. 8 and 9 show the above-mentioned switching action. As the slider 14 is moved toward the switching means, each of the tapered portions 18 and 18' of the working members respectively abuts against the angular ends 26 and 27 of the movable contact 20, and then the connecting portion of the movable contact 20 abuts against the engaging stopper 22. As the slider 14 is further moved toward the switching means, the movable contact begins to be subjected to an elastic deformation and at last, the elongated portions of the movable contact is suddenly thrown by the spring force due to the elastic formation into the gap between the two working members 16 and 17. As a result, the connections of the movable contacts and the stationary contact are turned to "OFF" from "ON." The gap between the engaging stoppers 22 and 23 is effective in providing the space for the elastic deformation of the movable contact in the above-mentioned switch action. When the slider 14 is moved away from the switching action, each of the angular ends 26 and 27 of the movable contact 20 is engaged respectively with the pointed projections 24 and 25 of the working members. Hence, the movable contact is moved together with the slider 14 and then the connecting portion of the U-shaped movable contact abuts against the engaging stopper 23. As the slider is further moved away from the switching means, the movable contact begins to undergo an elastic deformation and at last, is suddenly thrown out of the gap between the working members 16 and 17 by the spring force due to such elastic deformation. As a result, each elongated portions of the movable contact respectively contacts with the stationary contacts 6 and 7, and the circuit is turned "ON" from "OFF."

The switching means may be composed of a U-shaped movable contact having two elongated portions, each of which is respectively urged to be moved toward the centerline 40 by its own spring force, and two stationary contacts 6 and 7, each of which is disposed respectively at the center side of the both elongated portions of the movable contact 20. In this case, the switch-working means should be formed into a wedge-shaped working member. The wedge-shaped member is inserted into the gap between the two elongated portions of the U-shaped movable contact and cuts off the connection of the movable contacts and the stationary contacts.

Figure 10:
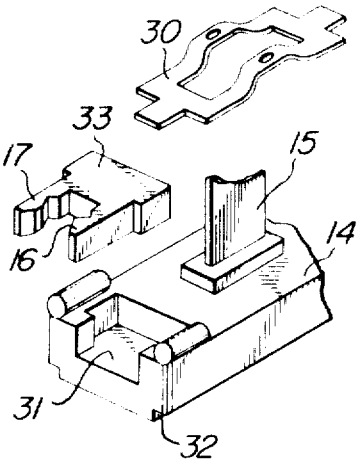
FIG. 10 is a perspective view showing a construction of a switch-working means in another embodiment according to the invention.

FIG. 10 shows another embodiment of the invention, in which the switch-working means is modified compared with the embodiment shown in FIG. 1. The slider 14 is provided with an opening 31 at the end portion adjacent to the switching means thereof, and a changing segment 33 is loosely fitted into the opening and is held by the spring plate 30 being laid on the slider 14. The opening 31 is formed to have such a contour that the changing segment is slightly movable in the moving direction of the slider. The changing segment 33 is provided with two similar working members 16 and 17, each of which has the respective tapered portions 18 and 18', and also has the respective pointed projections 24 and 25. The working members act as a switch-working means. The switching means of this embodiment is the same as that of the embodiment shown in FIG. 1. That is, the switching means consists of two stationary contacts 6 and 7, and two movable contacts 8 and 9. Each of the movable contacts 8 and 9 is formed of a U-shaped metallic spring plate having an elongated portion at the end thereof and is respectively opposed to the stationary contacts 6 and 7. Each elongated portion of the movable contacts 8 and 9 is urged to be moved away from the centerline and hence, is held to normally abut against the respective stationary contacts 6 and 7 being disposed at one side of that elongated portion remotest from the centerline. Thus, the movable contacts and the stationary contacts compose a switching means.

Figure 11:
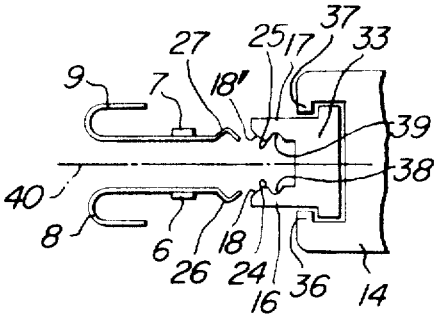
FIGS. 11, 12 and 13 are explanatory drawings showing a switching action of a switching means in connection with a switch-working means in the above embodiment.
Figure 12:
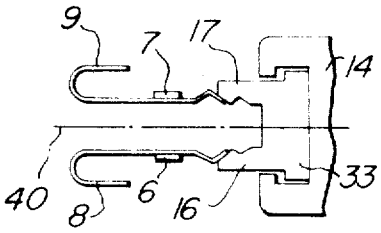
Figure 13:
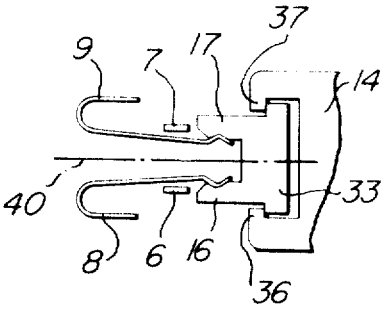

When the slider 14 is moved to the utmost end of its movement toward the switching means, both the elongated portions of the movable contacts are inserted into the gap between the working members 16 and 17, and both connections of the movable contacts and the stationary contacts are cut off. This switching action is shown in FIGS. 11, 12 and 13. In FIG. 11, the switch means is separated from the changing segment 33. As the slider is moved toward the switching means, each of the tapered ends 18 and 18' of the working members abuts respectively against the angular portions 26 and 27 of the movable contacts and the changing segment 33 abuts against the sidewall of the opening 31 being at the rear side of the changing segment in the moving direction thereof. As the slider 14 is further moved toward the switching means, each of the elongated portions of the movable contacts 8 and 9 begins to be deformed so as to be concave toward the centerline. When each of the pointed projections 24 and 25 of the working members 16 and 17 is moved just beyond the respective angular portions 26 and 27 of the movable contacts 8 and 9, the changing segment 33 is suddenly thrown toward the switching means by the spring force of the movable contacts due to elastic deformation and the position of the changing segment 33 is shifted to that shown in FIG. 13. Each of the movable contacts 8 and 9 is separated respectively from the stationary contacts 6 and 7, and hence the circuit is turned off. The working members 16 and 17 may be respectively provided with the recess 38 and 39 next to the respective pointed projections 24 and 25 to give a higher reliability of the switching action. In this case, the movable contacts 8 and 9 are inserted into a gap between the working members 16 and 17 of the changing segment 33 in such a manner that the movable contacts 8 and 9 gradually come near to each other and come nearest when the pointed ends of the angular portions 26 and 27 just ride on the pointed projections 24 and 25 of the working members 16 and 17 respectively. Immediately after the above state, the angular portions 26 and 27 of the movable contacts respectively abut against the recesses 38 and 39 provided on the working members 16 and 17 by virtue of their own spring forces, with an effect of more reliable and snapped switching action, while the changing segment 33 abuts against the engaging steps 36 and 37 so as to assist the above switching action. When the slider is subsequently moved away from the switching means, the changing segment 33 is separated from the movable contacts 8 and 9, which respectively contact the stationary contacts 6 and 7 so as to switch on the circuit. In this case, the movable contacts 8 and 9 come nearest to each other by respectively riding on the pointed projections 24 and 25 of the working members 16 and 17, and then respectively abut against the stationary contacts 6 and 7 due to their own spring forces resulting in a reliable and snapped switching action same as the former case. The changing segment 33 also assists the switching action by virtue of abuttting against the wall side of the slider 14. In the embodiment as shown in FIG. 7, the working members 16 and 17 may be also provided with the respective recesses 38 and 39 to give more reliable and snapped switching action. The switching means may be arranged in such a way that each of the elongated portions of the movable contacts 8 and 9 is urged to be respectively moved by its own spring force toward the centerline and each of the stationary contacts 6 and 7 is disposed at the center side of the respective movable contacts 8 and 9. In this case, the changing segment should be provided with a wedge-type working member. The changing segment is movably fitted into the opening 31. When the slider 14 is moved to the switching means, the wedge-type working member is inserted into the gap between the two movable contacts 8 and 9, and the connections of the movable contacts and the stationary contacts are cut off. The switching action of this case is also very reliable and sure, since it is carried out by the sliding action of the slider itself.

In the above-mentioned embodiment, the switching means is arranged at one of both end portions of the dielectric base. However, the switching means may be provided at both ends.

As aforesaid, the variable resistor of the sliding type having a switch of this invention has the advantages that the construction is very simple, the device can be quite small and the switching action is very sure. The simple construction provides the advantages that the assembling and manufacturing of the device is very easy and moreover, it is possible to give the device a sure switching action and provide excellent quality at a very low cost.

What is claimed is:

1. A sliding-type variable resistor with switch comprising an elongated channel-type upper housing having an upper wall and sidewalls, said upper wall having a longitudinally extended slot;

a baseplate of a dielectric material being mounted so as to define a closed channel in cooperation with said upper housing, said baseplate being provided longitudinally thereon with a pair of projections, a resistance element and a conductive element;

connecting terminals connected to said resistance element and said conductive element, respectively;

a slider being disposed inside said closed channel and slidable longitudinally along said baseplate, said slider having a pair of step portions slidably engaged with said projections provided on said baseplate, respectively, at least two contactors which slidably contact with said resistance element and said conductive element, respectively, and are connected with each other, spring means being slidably in contact with an inner side of said upper wall of said upper housing, and operating means extended through said slot provided to said upper wall;

switch-actuating means including working member means fixed to said slider and outwardly extended in the sliding direction of said slider;

switch means disposed on at least one of the longitudinal end portions of said baseplate so as to be cooperative with said working member means, said switch means including a pair of U-shaped movable contacts each having an arm fixed to said baseplate and a resilient free arm having a portion engageable with said working member means, and a pair of stationary contacts fixed to said baseplate for constituting a pair of switches in cooperation with said movable contacts, respectively, said movable contacts being moved in a direction substantially perpendicular to the sliding direction of said slider by said engagement between said portions of said resilient free arms and said working member means thereby to operate said switches.

2. A sliding-type variable resistor with switch according to claim 1, wherein said working member means comprises a pair of working members extended in the sliding direction of said slider, said movable contacts are moved inwardly by the engagement of said working member, and said stationary contacts are disposed outwards said movable contacts and spaced therefrom by the movement of said movable contacts.

3. A sliding-type variable resistor with switch according to claim 1, wherein said working member means comprises a wedge-shaped working member extended in the sliding direction of said slider, said movable contacts are moved outwardly by the engagement of said working member, and said stationary contacts are disposed inwards said movable contacts.

4. A sliding-type variable resistor with switch comprising an elongated channel-type upper housing having an upper wall and sidewalls, said upper wall having a longitudinally extended slot;

a baseplate of a dielectric material being mounted so as to define a closed channel in cooperation with said upper housing, said baseplate being provided longitudinally thereon with a pair of projections, a resistance element and a conductive element;

connecting terminals connected to said resistance element and said conductive element, respectively;

a slider being disposed inside said closed channel and slidable longitudinally along said baseplate, said slider having a pair of step portions slidably engaged with said projections provided on said baseplate, respectively, at least two contactors which slidably contact with said resistance element and said conductive element, respectively, and are connected with each other, spring means being slidably in contact with an inner side of said upper wall of said upper housing, and operating means extended through said slot provided to said upper wall;

switch-actuating means including working member means fixed to said slider and outwardly extended in the sliding direction of said slider;

switch means disposed on at least one of the longitudinal end portions of said baseplate so as to be cooperative with said working member means, said switch means including a U-shaped contact plate which is mounted on said one of the longitudinal end portions so as to be slightly movable in the sliding direction of said slider and has a pair of resilient free arms each having a portion engageable with said working member means, and further including a pair of stationary contacts fixed to said baseplate for constituting a pair of switches in cooperation with said resilient free arms, said resilient free arms being moved in a direction substantially perpendicular to the sliding direction of said slider by said engagement between said portions of said free arms and said working member means thereby to operate said switches.

5. A sliding-type variable resistor with switch according to claim 4, wherein said working member means comprises a pair of working members extended in the sliding direction of said slider, said resilient free arms are moved inwardly by the engagement of said working members, and said stationary contacts are disposed outwards said free arms.

6. A sliding-type variable resistor with switch according to claim 4, wherein said working member means comprises a wedge-shaped working member extended in the sliding direction of said slider, said resiilent free arms are moved outwardly by the engagement of said working member, and said stationary contacts are disposed inwards said free arms.

7. A sliding-type variable resistor with switch comprising an elongated channel-type upper housing having an upper wall and sidewalls, said upper wall having a longitudinally extended slot;

a baseplate of a dielectric material being mounted so as to define a closed channel in cooperation with said upper housing, said baseplate being provided longitudinally thereon with a pair of projections, a resistance element and a conductive element;

connecting terminals connected to said resistance element and said conductive element, respectively;

a slider being disposed inside said closed channel and slidable longitudinally along said baseplate, said slide having a pair of step portions slidably engaged with said projections provided on said baseplate, respectively, at least two contactors which slidably contact with said resistance element and said conductive element, respectively, and are connected with each other, spring means being slidably in contact with an inner side of said upper wall of said upper housing, and operating means extended through said slot provided to said upper wall;

switch-actuating means being mounted on said slider and slightly movable in the sliding direction of said slider, said switch-actuating means including working member means outwardly extended in said sliding direction;

switching means disposed on at least one of the longitudinal end portions of said baseplate so as to be cooperative with said working member means, said switch means including a pair of U-shaped movable contacts each having an arm fixed to said baseplate and a resilient free arm having a portion engageable with said working member means, and a pair of stationary contacts fixed to said baseplate for constituting a pair of switches in cooperation with said movable contacts, respectively, said movable contacts being moved in a direction substantially perpendicular to the sliding direction of said slider by said engagement between said portion of said free arms and said working member means thereby to operate said switches.

8. A sliding-type variable resistor with switch according to claim 7, wherein said working member means comprises a pair of working members extended in the sliding direction of said slider, said movable contacts are moved inwardly by the engagement of said working members and said stationary contacts are disposed outwards said movable contacts.

9. A sliding-type variable resistor with switch according to claim 7, wherein said working member means comprises a wedge-shaped working member extended in the sliding direction of said slider, said movable contacts are moved outwardly by the engagement of said working member and said stationary contacts are disposed inwards said movable contacts.

*10. A sliding-type variable resistor with switch comprising an elongated channel-type upper housing having an upper wall and sidewalls, said upper wall having a longitudinally extended slot;*

*a baseplate of a dielectric material being mounted so as to define a closed channel in cooperation with said upper housing, said baseplate being provided longitudinally thereon with a resistance element and a conductive element;*

*connecting terminals connected to said resistance element and said conductive element, respectively;*

*a slider being disposed inside said closed channel and slidable longitudinally along said baseplate, said slider having at least two contactors which slidable contact with said resistance element and said conductive element, respectively, and are connected with each other, spring means being slidably in contact with an inner side of said upper wall of said upper housing, and operating means extended through said slot provided to said upper wall;*

*switch-actuating means including working member means fixed to said slider and outwardly extended in the sliding direction of said slider;*

*switch means disposed on at least one of the longitudinal end portions of said baseplate so as to be cooperative with said working member means, said switch means including a pair of U-shaped movable contacts each having an arm fixed to said baseplate and a resilient free arm having a portion engageable with said working member means, and a pair of stationary contacts fixed to said baseplate for constituting a pair of switches in cooperation with said movable contacts, respectively, said movable contacts being moved in a direction substantially perpendicular to the sliding direction of said slider by said engagement between said portions of said resilient free arms and said working member means thereby to operate said switches.*

*11. A sliding-type variable resistor with switch comprising an elongated channel-type upper housing having an upper wall and sidewalls, said upper wall having a longitudinally extended slot;*

*a baseplate of a dielectric material being mounted so as to define a closed channel in cooperation with said upper housing, said baseplate being provided longitudinally thereon with a resistance element and a conductive element;*

*connecting terminals connected to said resistance element and said conductive element, respectively;*

*a slider being disposed inside said closed channel and slidable longitudinally along said baseplate, said slider having at least two contactors which slidably contact with said resistance element and said conductive element, respectively, and are connected with each other, spring means being slidably in contact with an inner side of said upper wall of said upper housing and operating means extended through said slot provided to said upper wall;*

*switch-actuating means including working member means fixed to said slider and outwardly extended in the sliding direction of said slider;*

*switch means disposed on at least one of the longitudinal end portions of said baseplate so as to be cooperative with said working member means, said switch means including a U-shaped contact plate which is mounted on said one of the longitudinal end portions so as to be slightly movable in the sliding*

*direction of said slider and has a pair of resilient free arms each having a portion engageable with said working member means, and further including a pair of stationary contacts fixed to said baseplate for constituting a pair of switches in cooperation with said resilient free arms, said resilient free arms being moved in a direction substantially perpendicular to the sliding direction of said slider by said engagement between said portions of said free arms and said working member means thereby to operate said switches.*

*12. A sliding-type variable resistor with switch comprising an elongated channel-type upper housing having an upper wall and sidewalls, said upper wall having a longitudinally extended slot;*

*a baseplate of a dielectric material being mounted so as to define a closed channel in cooperation with said upper housing, said baseplate being provided longitudinally thereon with a resistance element and a conductive element;*

*connecting terminals connected to said resistance element and said conductive element, respectively;*

*a slider being disposed inside said closed channel and slidable longitudinally along said baseplate, said slider having at least two contactors which slidably contact with said resistance element and said conductive element, respectively, and are connected with each other, spring means being slidably in contact with an inner side of said upper wall of said upper housing, and operating means extended through said slot provided to said upper wall;*

*switch-actuating means being mounted on said slider and slightly movable in the sliding direction of said slider, said switch-actuating means including working member means outwardly extended in said sliding direction;*

*switching means disposed on at least one of the longitudinal end portions of said baseplate so as to be cooperative with said working member means, said switch means including a pair of U-shaped movable contacts each having an arm fixed to said baseplate and a resilient free arm having a portion engageable with said working member means, and a pair of stationary contacts fixed to said baseplate for constituting a pair of switches in cooperation with said movable contacts, respectively, said movable contacts being moved in a direction substantially perpendicular to the sliding direction of said slider by said engagement between said portions of said free arms and said working member means thereby to operate said switches.*

References Cited

The following references, cited by the Examiner, are of record in the patented file of this patent or the original patent.

UNITED STATES PATENTS

| | | | |
|---|---|---|---|
| 3,497,857 | 2/1970 | Pfeufer | 338—198 |
| 3,381,254 | 4/1968 | Campbell | 338—179 |
| 2,122,643 | 7/1938 | Golemb | 200—159 R |
| 2,558,188 | 6/1951 | MvWilliams | 200—153 LA |
| 3,566,330 | 2/1971 | Ichikawa | 338—183 |
| 2,471,568 | 5/1949 | Hardison | 200—159 X |
| 3,375,446 | 3/1968 | Guyton | 338—198 X |

ROBERT K. SCHAFER, Primary Examiner

G. P. TOLIN, Assistant Examiner

U.S. Cl. X.R.

200—153 LA; 338—179